(12) United States Patent
Kuusisaari (10) Patent No.: US 8,656,051 B2
(45) Date of Patent: Feb. 18, 2014

(54) METHOD AND DEVICE FOR NETWORK ADDRESS CONFIGURATION

(75) Inventor: Juhamatti Kuusisaari, Helsinki (FI)

(73) Assignee: Tellabs Oy, Espoo (FI)

( * ) Notice: Subject to any disclaimer, the term of this patent is extended or adjusted under 35 U.S.C. 154(b) by 202 days.

(21) Appl. No.: 13/088,624

(22) Filed: Apr. 18, 2011

(65) Prior Publication Data
US 2011/0258343 A1 Oct. 20, 2011

(30) Foreign Application Priority Data

Apr. 20, 2010 (FI) .................................... 20105418

(51) Int. Cl.
*G06F 15/16* (2006.01)
(52) U.S. Cl.
USPC ......................................... 709/245; 709/203
(58) Field of Classification Search
USPC ................. 709/203, 219, 245, 200
See application file for complete search history.

(56) References Cited

U.S. PATENT DOCUMENTS

| | | | |
|---|---|---|---|
| 6,457,053 | B1 | 9/2002 | Satagopan et al. |
| 7,577,138 | B2 | 8/2009 | Bras et al. |
| 2006/0092936 | A1 | 5/2006 | Luss |
| 2008/0159289 | A1 | 7/2008 | Narayanan et al. |
| 2008/0259925 | A1 | 10/2008 | Droms et al. |

FOREIGN PATENT DOCUMENTS

WO 2006/042983 A1 4/2006

OTHER PUBLICATIONS

Byung-Yeob Kim, "Hierarchical prefix delegation protocol for Internet Protocol-Version 6 (IPv6)", Feb. 15, 2004, Chapters 1-9.*

Byung-Yeob Kim Kyeong-Jin Lee Jung-Soo Park Hyoung-Jun Kim Etri: "Hierarchical Prefix Delegation Protocol for Internet Protocol Version 6 (IPv6); draft-bykim-ipv6-hpd-OI.txt", IETF Standard-Working-Draft, Internet Engineering Task Force, IETF, CH, No. 1, Feb. 15, 2004, XP015011290.

Joo-Chul Lee et al: "Implementation of IPv6 prefix delegation mechanism using DHCPv6 protocol", Advanced Communication Technology, 2005, ICACT 2005, The 7th International Conference on Phoenix Park, Korea Feb. 21-23, 2005, vol. 1, No. 7, Feb. 21, 2005, pp. 635-640, XP010813718.

European Search Report, dated Aug. 3, 2011, in Application No. EP 11 15 9307.

Finnish Search Report, dated Nov. 18, 2010, from corresponding Finnish application.

\* cited by examiner

*Primary Examiner* — El Hadji Sall
(74) *Attorney, Agent, or Firm* — Young & Thompson (57) ABSTRACT

A data transfer system comprises interconnected network devices organized to constitute a hierarchical logical arrangement having at least three levels of network hierarchy. A network device (102) receives from another network device (101) that is higher at the hierarchy a first data item such as an IP-prefix defining a first set of network addresses such as IP-addresses. The network device composes second data items so that each of the second data items defines one of mutually non-overlapping sub-sets of the first set. The network device transmits the second data items to network devices (104, 105) that are lower at the hierarchy in order to allocate one of the sub-sets to each of these network devices at the lower level of the hierarchy. This procedure can be repeated on all levels of the network hierarchy. Thus, the address configuration can propagate downwards through the hierarchical logical arrangement of the network devices.

32 Claims, 5 Drawing Sheets

METHOD AND DEVICE FOR NETWORK ADDRESS CONFIGURATION

FIELD OF THE INVENTION

The invention relates generally to network address configuration in a communication network. Network addresses can be, for example but not necessarily, IP-addresses (Internet Protocol). More particularly, the invention relates to a method for network address configuration, to a network device, to a data transfer system, and to a computer program for network address configuration.

BACKGROUND

Communication networks include network devices such as, for example, Internet Protocol routers and data transfer links connecting the network devices to each other. Concerning, for example, communication networks employing the Internet Protocol ("IP"), there are several methods to configure host network addresses, i.e. host IP-addresses, but much less means are provided to router interface network address, i.e. interface IP-address, configuration. Commonly in IPv4 (Internet Protocol—version 4) enabled networks, hosts have their changing network addresses through the Dynamic Host Configuration Protocol (DHCP) during boot-up. Routers have usually statically allocated permanent network addresses from global or non-global address blocks. The IPv6 (Internet Protocol—version 6) and its neighbor discovery schema ("NEIGHD") allow auto-configuration with Router Solicitation and Router Advertisement messages which can be used to autoconfigure host IPv6-addresses. Nevertheless, routers of an IPv6-communication network are not included in the auto-configuration framework and the additions of IPv6-address auto-configuration ("ADDRCONF") and the above-mentioned Neighbor Discovery scheme do not remove the complexity of configuring routers in an IPv6-communication network.

Publication US2008259925 discloses a method for delegating Internet Protocol network address-prefixes between routers that are connected with data transfer links to each other so as to constitute a hierarchical logical arrangement. The method comprises detecting, by a router, a first router advertisement message received from another router situated at a higher level of the hierarchical logical arrangement. The first router advertisement message is arranged to specify a first network address-prefix owned by the other router and usable for address auto-configuration in the router. The router can perform recursive network address-prefix delegation and assign a sub-portion of the first network address-prefix to other routers situated at a lower level of the hierarchical logical arrangement. Hence, the routers can automatically obtain delegated network address-prefixes from received router advertisement messages specifying prefix delegation information options. However, in order to avoid double allocation of network addresses, the routers may have to claim and defend the obtained network address-prefixes using neighbor advertisement messages specifying prefix claim/ownership information.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new data transfer system comprising network devices interconnected with data transfer links and organized to constitute a hierarchical logical arrangement. The network devices include a first network device, a second network device at a lower level of the network hierarchy than the first network device, and at least two third network devices at a lower level of the network hierarchy than the second network device, wherein:

- the first network device is arranged to transmit to the second network device a first data item defining a first set of network addresses related to a communication protocol being used by the network devices,
- the second network device comprises a processing circuitry for composing second data items on the basis of the first data item so that each of the second data items is defining one of second sets of network addresses, the second sets of network addresses being mutually non-overlapping sub-sets of the first set of network addresses, and
- the second network device is arranged to transmit the second data items to the at least two third network devices, each of the third network devices being a destination for one of the second data items in order to allocate one of the second sets of network addresses to each of the third network devices.

As the second sets of network addresses are mutually non-overlapping sub-sets of the first set of network addresses, an overlap between the network addresses allocated for different ones of the third network devices is inherently avoided, and thus the third network devices do not have to claim and/or defend the obtained network addresses in order to avoid double allocation of the network addresses. The communication protocol being used by the network devices can be, for example but not necessarily, the Internet Protocol ("IP"). In this specific case, the first data item may contain a network address-prefix defining a sub-set of the Internet address space, and the processing circuitry can be arranged to form mutually non-overlapping elongations of the network address-prefix so as to compose the second data items. The Internet Protocol can be either IPv4 or IPv6. For another example, the communication protocol can be the Connection-Less Network Service ("CLNS") that uses addressing data conforming to the ISO 10589 specification (International Standards Organization).

The above described principle can be, for example but not necessarily, used at several successive levels of the network hierarchy so that a network device situated at a certain level of the network hierarchy divides a set of network addresses indicated by a network device at a higher level of the network hierarchy into mutually non-overlapping sub-sets and further indicates the sub-sets to network devices situated at a lower level of the network hierarchy. Thus, the address configuration can be arranged to propagate through the hierarchical logical arrangement constituted by the network devices. As the sub-sets are mutually non-overlapping at each level of the network hierarchy, the double allocation of the network addresses is avoided automatically.

In accordance with the second aspect of the invention there is provided a new network device that can be used as an element of the above-described data transfer system. The network device comprises:

a reception interface for receiving, via a communication network, from a first other network device a first data item defining a first set of network addresses related to a communication protocol being used in the communication network, a processing circuitry for composing at least two second data items on the basis of the first data item so that each of the second data items is defining one of second sets of network addresses, the second sets of network addresses being mutually non-overlapping sub-sets of the first set of network addresses, and a transmission interface for transmitting, via the communication network, the at least two second data items to at least two second other network devices, each of the second other network devices being a destination for one of the second data items in order to allocate one of the second sets of network addresses to each of the second other network devices.

In accordance with the third aspect of the invention there is provided a new method for network address configuration. The method comprises:

receiving from a network device of a communication network a first data item defining a first set of network addresses related to a communication protocol being used in the communication network, composing second data items on the basis of the first data item so that each of the second data items defines one of second sets of network addresses, the second sets of network addresses being mutually non-overlapping sub-sets of the first set of network addresses, and transmitting the second data items to at least two other network devices of the communication network, each of the other network devices being a destination for one of the second data items in order to allocate one of the second sets of network addresses to each of the other network devices.

In accordance with the fourth aspect of the invention there is provided a new computer program for network address configuration. The computer program comprises computer executable instructions for controlling a programmable processor of a network device to:

extract from data received, via a communication network, from a first other network device a first data item defining a first set of network addresses related to a communication protocol being used by the network device, compose at least two second data items on the basis of the first data item so that each of the second data items is defining one of second sets of network addresses, the second sets of network addresses being mutually non-overlapping sub-sets of the first set of network addresses, and controlling the network device to transmit, via the communication network, the at least two second data items to at least two second other network devices, each of the second other network devices being a destination for one of the second data items in order to allocate one of the second sets of network addresses to each of the second other network devices.

In accordance with the fifth aspect of the invention there is provided a new computer program product. The computer program product comprises a computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
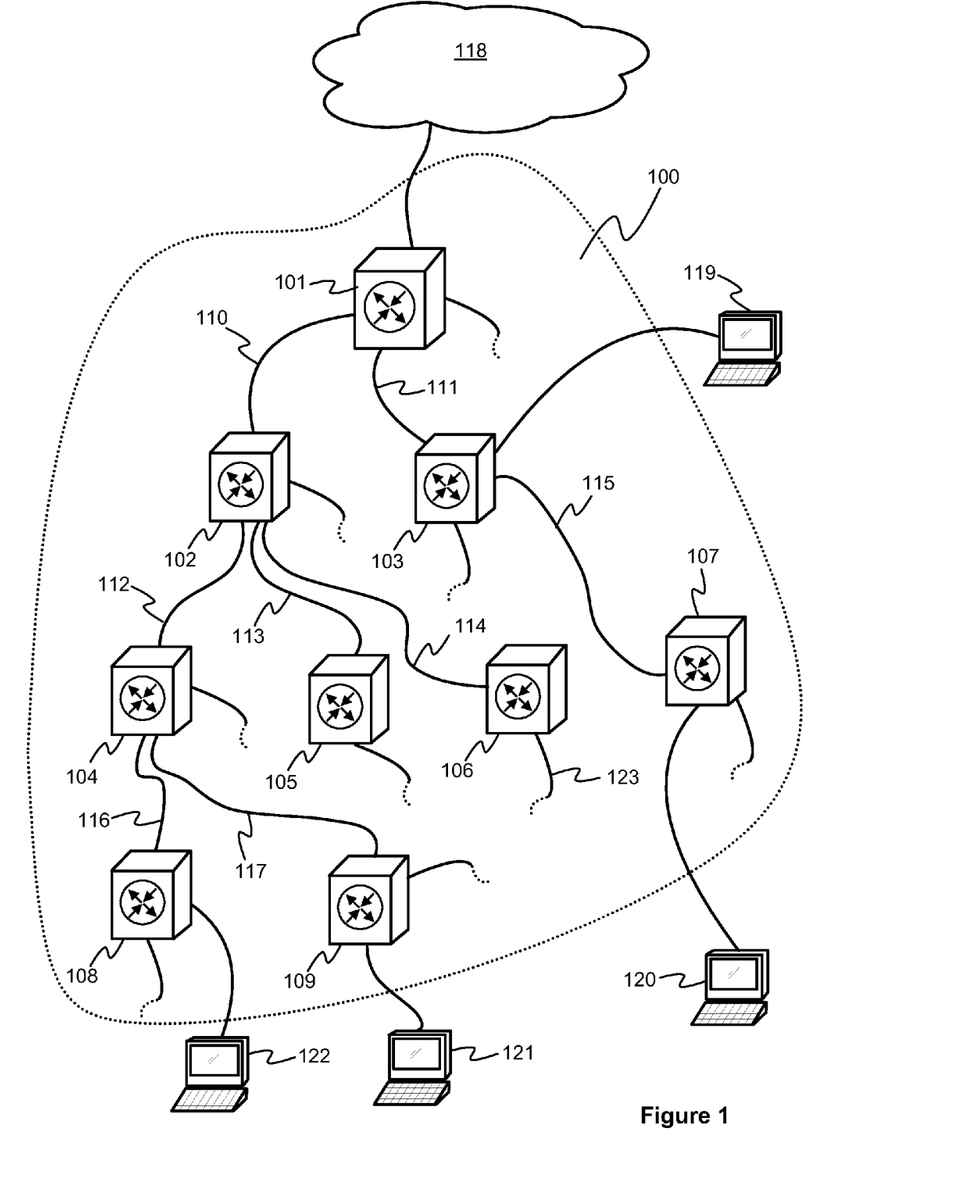
FIG. 1 shows a schematic illustration of a data transfer system according to an embodiment of the invention.

FIG. 1 shows a schematic illustration of a data transfer system 100 according to an embodiment of the invention. The data transfer system can be, for example but not necessarily, a personal area network ("PAN"), a local area network ("LAN"), a metropolitan area network ("MAN"), a wide area network ("WAN"), a combination of two or more of the above-mentioned, or a part of any of the above-mentioned. In the exemplifying case shown in FIG. 1, the data transfer system comprises network devices 101, 102, 103, 104, 105, 106, 107, 108, and 109 which are interconnected with data transfer links 110, 111, 112, 113, 114, 115, 116, and 117. The data transfer system is connected to a communication network 118 that can be, for example, the Internet. The network devices 101-109 can be, for example but not necessarily, routers arranged to support the Internet Protocol. Furthermore, the network devices may be arranged to support, for example, the Multi Protocol Label Switching ("MPLS"). Terminal devices 119, 120, 121, and 122 can be connected to the data transfer system 100 as illustrated in FIG. 1. In addition to the network devices 101-109, the data transfer system may comprise network devices which are not shown in FIG. 1 and/or the data transfer system may be connected to terminal devices which are not shown in FIG. 1. This is illustrated in FIG. 1 with data transfer links drawn to continue as a dashed-line such as a data transfer link 123. The network devices of the data transfer system have been organized to constitute a hierarchical logical arrangement that comprises several levels of network hierarchy. In FIG. 1, the network devices 101-109 are connected with the data transfer links 110-117 to form a tree-like structure in which the network device 101 is a root node that transfers all the data traffic between the data transfer system 100 and the communication network 118. The network device 101 represents the highest network hierarchy in the data transfer system. The network devices 102 and 103 represent the next lower level of the network hierarchy, the network devices 104-107 represent a still lower level of the network hierarchy, and the network devices 108 and 109 represents the lowest level of the network hierarchy. It should be, however, noted that the network devices could be organized to form a hierarchical logical arrangement even if the physical interconnections realized with the data transfer links were not according to a tree-like structure. For example, it is possible to organize the network devices to form a hierarchical logical arrangement also in a case, in which there is a full mesh of data transfer links between the network devices, so that the network devices are provided with information that indicates the structure of the hierarchical logical arrangement. In the exemplifying case illustrated in FIG. 1, the structure of the hierarchical logical arrangement is determined by the connections realized with the data transfer links 110-117.

In the data transfer system illustrated in FIG. 1, a first network device is arranged to transmit to a second network device that is situated at a lower level of the network hierarchy a first data item defining a first set of network addresses related to a communication protocol being used by the network devices. The second network device comprises a processing circuitry for composing second data items on the basis of the first data item so that each of the second data items is defining one of second sets of network addresses, the second sets of network addresses being mutually non-overlapping sub-sets of the first set of network addresses. The second network device is arranged to transmit the second data items to the at least two third network devices, each of the third network devices being a destination for one of the second data items in order to allocate one of the second sets of network addresses to each of the third network devices. As the second sets of network addresses are mutually non-overlapping sub-sets of the first set of network addresses, an overlap between the network addresses allocated for different ones of the third network devices is inherently avoided, and thus the third network devices do not have to claim and/or defend the obtained network addresses in order to avoid double allocation of the network addresses. In addition to allocating the second sets of network addresses to the third network devices, the second network device may take one or more of the network addresses indicated by the first data item to its own use, for example as a device address and/or as port addresses. Each of the third network devices can further-allocate some of the network addresses indicated by the second data item to network devices situated at a still lower level of the network hierarchy and/or take some of the network addresses indicated by the second data item to its own use, e.g. as a device address and/or as port addresses.

The above-mentioned first network device, second network device, and at least two third network devices can be, for example, the network devices 101, 102, and 104-106, respectively. As well, the above-mentioned first network device, second network device, and at least two third network devices could be, for example, the network devices 102, 104, and 108-109, respectively. Without losing generality, we can assume in the following that the first network device, the second network device, and the at least two third network devices are the network devices 101, 102, and 104-106, respectively.

In a data transfer system according to an embodiment of the invention, the first network device 101 is arranged to transmit the first data item as a response to a request message received from the second network device 102. Alternatively, the first network device 101 can be arranged to transmit the first data item to a network device situated at a lower level of the network hierarchy as a response to a situation in which a data transfer link is established between the first network device and the network device situated at the lower level of the network hierarchy. The network device situated at the lower level of the network hierarchy can be, for example, arranged to transmit an acknowledgement message to the first network device as a response to receiving and accepting the first data item. For a skilled person it is straightforward to construct a message format suitable for the acknowledgement message.

In a data transfer system according to an embodiment of the invention, the second network device 102 is arranged to determine one of the second data items and transmit this second data item to one of the third network devices 104-106 as a response to a request message received from this third network device. Alternatively, the second network device 102 can be arranged to transmit the second data item to a network device situated at a lower level of the network hierarchy as a response to a situation in which a data transfer link is established between the second network device and the network device situated at the lower level of the network hierarchy. The network device situated at the lower level of the network hierarchy can be arranged to transmit an acknowledge message to the second network device as a response to receiving and accepting the second data item.

In a data transfer system according to an embodiment of the invention, the second network device 102 is arranged to transmit the above-mentioned request message to the first network device 101 as a response to a situation in which (i) the first data item has not been received at the first network device and (ii) a request message for a second data item has been received from one of the third network devices 104-106. In this case, the requests can be propagated in a step-by-step manner upwards in the network hierarchy and the data items indicating sets of network addresses are propagating in a step-by-step manner downwards in the network hierarchy.

In a data transfer system according to an embodiment of the invention, the second network device 102 is arranged to extract from the request message received from the third network device 104, 105 or 106 one or more preferences and to compose the relevant second data item at least partly on the basis of the one or more preferences so as to fulfil needs of the third network device. Depending on the communication protocol being used, the preferences may indicate for example the following things: a requested minimum number of the network addresses, a request for a right to further-allocate the network addresses to lower levels of the network hierarchy. The second network device 102 is preferably arranged to include control data to the second data item, wherein the control data indicates whether or not the third network device receiving this second data item is allowed to further divide the second set of network addresses defined by this second data item into smaller sub-sets and to allocate the smaller sub-sets for network devices situated at a lower level of the network hierarchy.

In a data transfer system according to an embodiment of the invention, the second network device 102 is arranged to include control data to the second data item, wherein the control data indicates an expiry time after which the second set of network addresses defined by this second data item are no longer valid and are free for re-allocation unless revalidated prior to the expiry time. The revalidation may take place, for example, in form of a specific revalidation message transmitted from the relevant third network device to the second network device 102. The sec- and network device is arranged to make the second set of network addresses allocated to one of the third network devices free for re-allocation as a response to a situation in which no revalidation message has been received from the one of the third network devices by the expiry time. Correspondingly, the first network 101 element may include to the first data item control data that indicates an expiry time after which the first set of network addresses defined by the first data item are no longer valid and are free for re-allocation unless revalidated prior to the expiry time. The revalidation may take place, for example, in form of a specific revalidation message transmitted from the second network 102 device to the first network device 101. For a skilled person it is straightforward to construct a message format suitable for the revalidation message. A permanent allocation can be accomplished, for example, by defining that a pre-determined bit-pattern as the expiry time in the control data, e.g. all ones, means an infinitely long validity time, i.e. the above-mentioned expiry time is infinitely far in the future.

In a data transfer system according to an embodiment of the invention, the second network device 102 is arranged to make the second set of network addresses allocated to one of the third network devices 104, 105 or 106 free for re-allocation as a response to a situation in which a data transfer connection to this third network device is lost.

In a data transfer system according to an embodiment of the invention, the second network device 102 is arranged to make the second set of network addresses allocated to one of the third network devices 104, 105 or 106 free for re-allocation as a response to receiving a release message from the one of the third network devices. This principle based on the release message can be used together with the above-mentioned principle in which the re-allocation is enabled when the data transfer connection is lost.

In a data transfer system according to an embodiment of the invention, the second network device 102 is arranged to transmit to the third network devices 104, 105, and 106 advertising messages indicating a network address of the second network device so as to enable the third network devices to transmit requests for the second data items.

In a data transfer system according to an embodiment of the invention, the network devices 101-109 are routers arranged to support the Internet Protocol ("IP") and the second network device 102 is arranged to extract from the first data item a network address-prefix defining a sub-set of the Internet address space. The second network device is arranged to form mutually non-overlapping elongations of the network address-prefix so as to compose the second data items. The first data item may contain, for example, the following network address-prefix 192.168.252.0/22 that indicates that the first set of the network addresses contains those IP-addresses whose 22 leftmost bits are same as the prefix. The first set of IP-addresses can be divided into non-overlapping sub-sets defined by the following network address-prefixes 192.168.252.0/24, 192.168.253.0/24, 192.168.254.0/24, and 192.168.255.0/24 which are mutually non-overlapping elongations of the network address-prefix 192.168.252.0/22. Therefore, the second data items delivered to the third network devices 104, 105, and 106 can contain, for example, the network-address prefixes 192.168.252.0/24, 192.168.253.0/24, and 192.168.254.0/24, respectively. The above examples are related to the IPv4. The same principle can be used also in conjunction with the IPv6.

In a data transfer system according to an embodiment of the invention, the second network device 102 is arranged to extract from the first data item two or more network address-prefixes defining mutually non-overlapping sub-sets of the Internet address space, and the second network device is arranged to make each of the second data items to comprise at least one of the network address-prefixes and/or at least one elongation of at least one of the network address-prefixes. The first data item may contain, for example, the following network address-prefixes 192.168.252.0/24 and 192.168.253.0/ 24 that indicate that the first set of the network addresses contains those IP-addresses whose 24 leftmost bits are same as one or other of these prefixes. The first set of IP-addresses can be divided into non-overlapping sub-sets which are defined, for example, by the following network address-prefixes 192.168.253.0/24, 192.168.252.0/25 and 192.168.252.128/25. Therefore, the second data items delivered to the third network devices 104, 105, and 106 can contain, for example, the network-address prefixes 192.168.253.0/24, 192.168.252.0/25 and 192.168.252.128/ 25, respectively. The above examples are related to the IPv4. The same principle can be used also in conjunction with the IPv6.

Figure 4A:
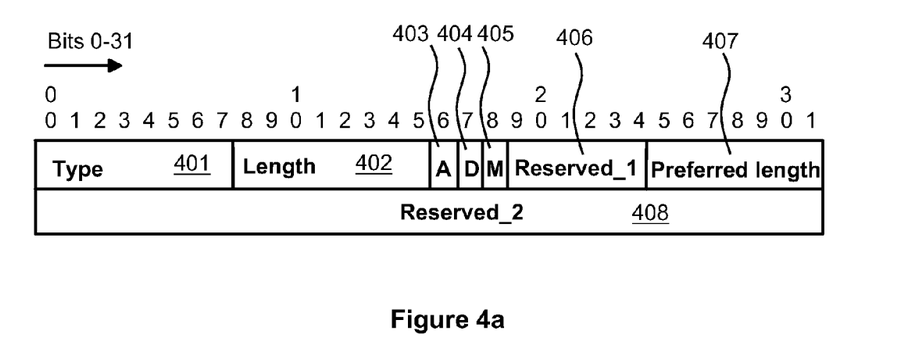
FIGS. 4a and 4b illustrate exemplifying message formats suitable for network address configuration.

FIG. 4a shows a diagram illustrating an exemplifying message format that can be used for a request message from the second network device 102 to the first network device 101 in order to request the first network device 101 to transmit the first data item including a network address-prefix, as well as for a request message from a third network device 104, 105 or 106 to the second network device 102. The request message provides a way to request dividable prefixes from a network device situated at a higher level of the network hierarchy. The request message can appear e.g. in a Router Solicitation message. The message format shown in FIG. 4a contains the following fields:

Type-field 401: a bit-pattern that indicates that the message is the above-described request message, Length-field 402: indicates the length of the message as bits or bytes, A-flag 403: an autonomous address-configuration flag; when set indicates that the network address-prefix received can be used for the address configuration, D-flag 404: a dividable address-configuration flag; when set indicates that the sending network device would prefer a network address-prefix that can be divided for lower hierarchy network devices and when not set, a dividable network address-prefix should not be sent as a response to this request message, M-flag 405: a dividable multi-address-configuration flag; when set indicates that the requesting network device would prefer a network address-prefix dividable for lower hierarchy network devices and has already received at least one dividable network address-prefix and network addresses covered by the least one earlier received dividable network address-prefix are running out, Reserved_1-field 406: an unused field for future use, Prefix length-field 407: a hint for a network device situated at a higher level of the network hierarchy about the preferred length of the requested network-address-prefix; nevertheless, the higher hierarchy network device decides the actual network address-prefix given to a requesting network device situated at a lower level of the network hierarchy; zero can be considered as there is no preference to the prefix length, Reserved_2-field 408: an unused field for future use.

The message format shown in FIG. 4a is suitable for the IPv6-protocol. For a skilled person it is straightforward to construct a similar message format suitable for the IPv4-protocol or for some other communication protocol, e.g. the Connection-Less Network Service ("CLNS") that uses addressing data conforming to the ISO 10589 specification (International Standards Organization).

Figure 4B:
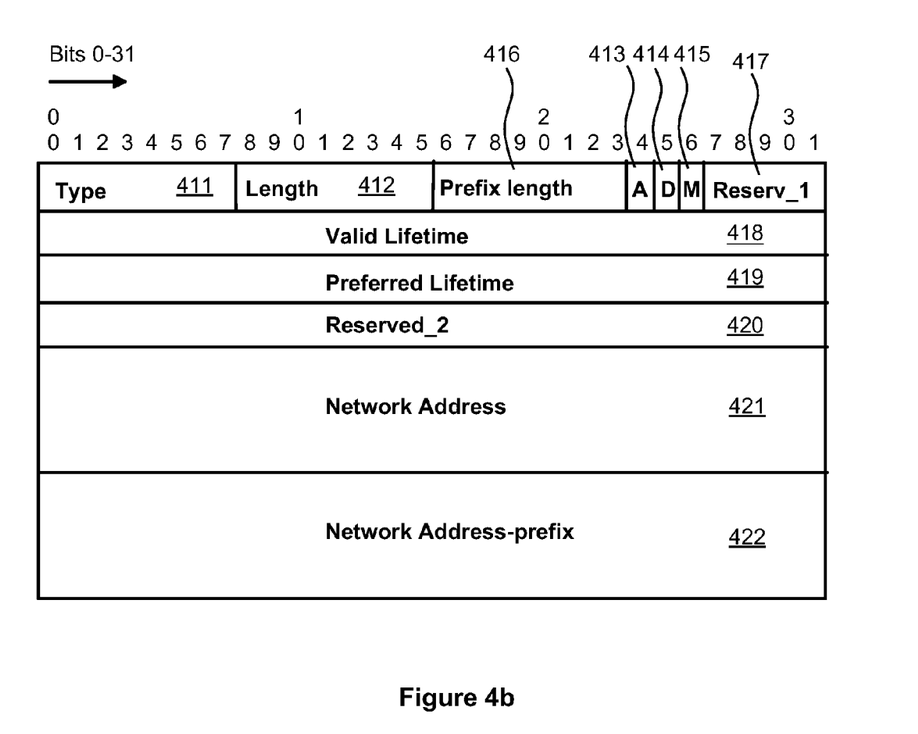

FIG. 4b shows a diagram illustrating an exemplifying message format that can be used for transmitting the first data item from the first network device 101 to the second network device 101 in order to transmit a network address-prefix to the second network device, as well as for transmitting second data items from the second network device 102 to the third network devices 104-106. The message format provides a way to provide network devices situated at a lower level of the network hierarchy with network addresses for their own use and with network addresses that can be further delivered for the use of network devices situated at a still lower level of the network hierarchy. The message can appear e.g. in a Router Advertisement message. The message format shown in FIG. 4b contains the following fields:

Type-field 411: a bit-pattern that indicates that the message is the above-described first or second data item including a network-address prefix, Length-field 412: indicates the length of the message as bits or bytes, A-flag 413: an autonomous address-configuration flag; when set indicates that the network address-prefix contained by this message can be used for the address configuration as described above, D-flag 414: a dividable address-configuration flag; when set indicates that the network address-prefix can be divided for lower hierarchy network devices, M-flag 415: a dividable multi-address-configuration flag; when set indicates that the network address-prefix can be divided for lower hierarchy network devices without affecting older network address allocations, Prefix length-field 416: the number of bits of the network address-prefix that are valid, i.e. the length of the network address prefix, Reserved__1-field 417: an unused field for future use, Valid lifetime-field 418: the length of time the network address-prefix is valid from the time instant the message is sent for the purpose of on-link determination; the value of all bits one can be defined to represent infinity; the Valid Lifetime can also be used by the IPv6-address auto-configuration ("ADDRCONF"), Preferred lifetime-field 419: The length of time the network addresses generated from the prefix remain preferred in the IPv6-address auto-configuration ("ADDRCONF"); the value of all bits one can be defined to represent infinity.

Reserved__2-field 420: an unused field for future use,

Network address-field 421: The network address of the network device sending this message, Network address-prefix field 422: The network address-prefix contained by this message, if the D-flag is set this network address-prefix can be divided and the divisions can be delivered to network devices situated at a lower level of the network hierarchy.

The message format shown in FIG. 4b is suitable for the IPv6-protocol. For a skilled person it is straightforward to construct a similar message format suitable for the IPv4-protocol or for some other communication protocol, e.g. the Connection-Less Network Service ("CLNS") that uses addressing data conforming to the ISO 10589 specification (International Standards Organization).

An exemplifying manner of operation of the data transfer system shown in FIG. 1 is described next. The request messaging from a network device situated at a lower level of the network hierarchy to a network device situated at a higher level of the network hierarchy is called "Router Prefix Information Request option" and the messaging containing the requested network address-prefix is called "Router Prefix Information Advertisement option".

The network device 101 could have a pool of network-address prefixes manually configured to be used with Router Prefix Information Advertisement option through Router Advertisements. The trunk interface(s) with the support from Router Solicitation messages with this Router Prefix Information Advertisement option are a configurable entity in the appropriate interface(s). The Router Prefix Information Advertisement option trunk interfaces are all the interfaces going to higher hierarchy direction. All other interfaces divide the pool received from the network device situated at a higher level of the hierarchy, if Router Prefix Information Advertisement options included in Router Advertisements have the dividable-flag ("D-flag") set. If a higher hierarchy network device gives a network address-prefix to a lower hierarchy network device, the given network address-prefix will stay reserved as long as the lower hierarchy network device is reachable in the network according to the neighbor discovery schema under IPv6 ("NEIGHD"). It is also possible that the given network address-prefix will stay reserved as long as the lower hierarchy network device sends a release message, or if the given network address-prefix is related to a given validity-time and no revalidation message is received from the lower hierarchy network device. In addition, a route to a sub-network defined by this network address-prefix is added to the higher hierarchy network device interface where the request was received.

The added route should be added with high metric value to allow routing protocol driven dynamic routes to override the static setting. When a valid network address-prefix is received, it is used to configure first the trunk interface with lowest matching prefix. The trunk interface is used as a default forwarding interface for unknown routes. If the dividable-flag ("D-flag") is set, the network address-prefix part left available after configuring trunk interface can be further divided through Router Advertisements with Router Prefix Information Advertisement option in response to a validly extended Router Solicitations with Router Prefix Information Request option included. If the dividable-flag is not set, the network address-prefix received cannot be divided more to lower levels of the network hierarchy.

If a lower hierarchy network device has some preference over the network prefix, it can add it to the Preferred prefix length field of Router Prefix Information Request option. The higher hierarchy network device should take the preference into account when a network address-prefix is given to a lower hierarchy network device. If addresses defined by dividable network address-prefixes are run out by a network device, the network device can request a new dividable prefix with a new Router Prefix Information Request option attached to a Router Solicitation sent to the trunk interface so that the M-flag is set, see FIG. 4a. However, this is preferably not done before the network addresses defined by the earlier received dividable network address-prefixes are actually run out. If a Router Prefix Information Advertisement option with the M-flag set is received, this preferably does not change the already configured trunk interface address or lower hierarchy network address-prefix assignments.

If a Router Advertisement with Prefix Information Advertisement option differing from previous advertisements and without the M-flag is received from the trunk interface, the receiving network device should clear all previous network address-prefixes and configure the trunk interface according to the new Router Prefix Information Advertisement option. Moreover, a new Router Advertisements with Router Prefix Information Advertisement options is preferably sent to lower level interfaces which have previously requested network address-prefixes, if the network address-prefix value received has been changed from the previously received.

If a network device cannot know its trunk interface beforehand and wants to use Router Prefix Information Advertisement options included in Router Advertisements, the network device can send Router Solicitation with Router Prefix Information Request option included to every interface with link state up and where it has received Router Advertisements during a pre-defined time period. The first interface where Router Advertisement with Router Prefix Information Advertisement option is received can be automatically selected as the trunk interface and therefore be used as default forwarding interface for unknown routes. If several responses are received, a Router Solicitation without the Router Prefix Information Request is preferably sent to the non-trunk interfaces to release the reservation.

The trunk auto-selection helps a network device to be configurable through e.g. network management system ("NMS") after node replacement in lower or higher hierarchy levels.

If a network device supports trunk interface auto-selection it will always try to find out its trunk interface automatically. However, if in addition the network device has a prefix pool allocated and it has not been able to receive any Router Advertisements with Router Prefix Information Advertisement option in a pre-defined wait period, it preferably starts to use its own pool of network address-prefixes for sharing addresses, if such is solicited. If several network devices at the highest level of the network hierarchy are available concurrently, i.e. a multi-root hierarchical network, network devices can be configured to use the network addresses already configured as long as the root for the network address prefix is reachable in the network according to the neighbor discovery schema under IPv6 ("NEIGHD"). More information about details of the IPv6 can be found from e.g.: S. Deering, R. Hinden, Internet Protocol, Version 6 (IPv6) Specification, IETF RFC 2460 (Internet Engineering Task Force, Request For Comments). More information about details of the neighbor discovery schema under IPv6 ("NEIGHD") can be found from e.g.: T. Narten et al., Neighbor Discovery for IP Version 6 (IPv6), IETF RFC 2461. More information about details of the IPv6-address auto-configuration ("ADDRCONF") can be found from e.g.: S. Thomson, T. Narten, IPv6 Stateless Address Auto-configuration, IETF RFC 2462.

Figure 2:
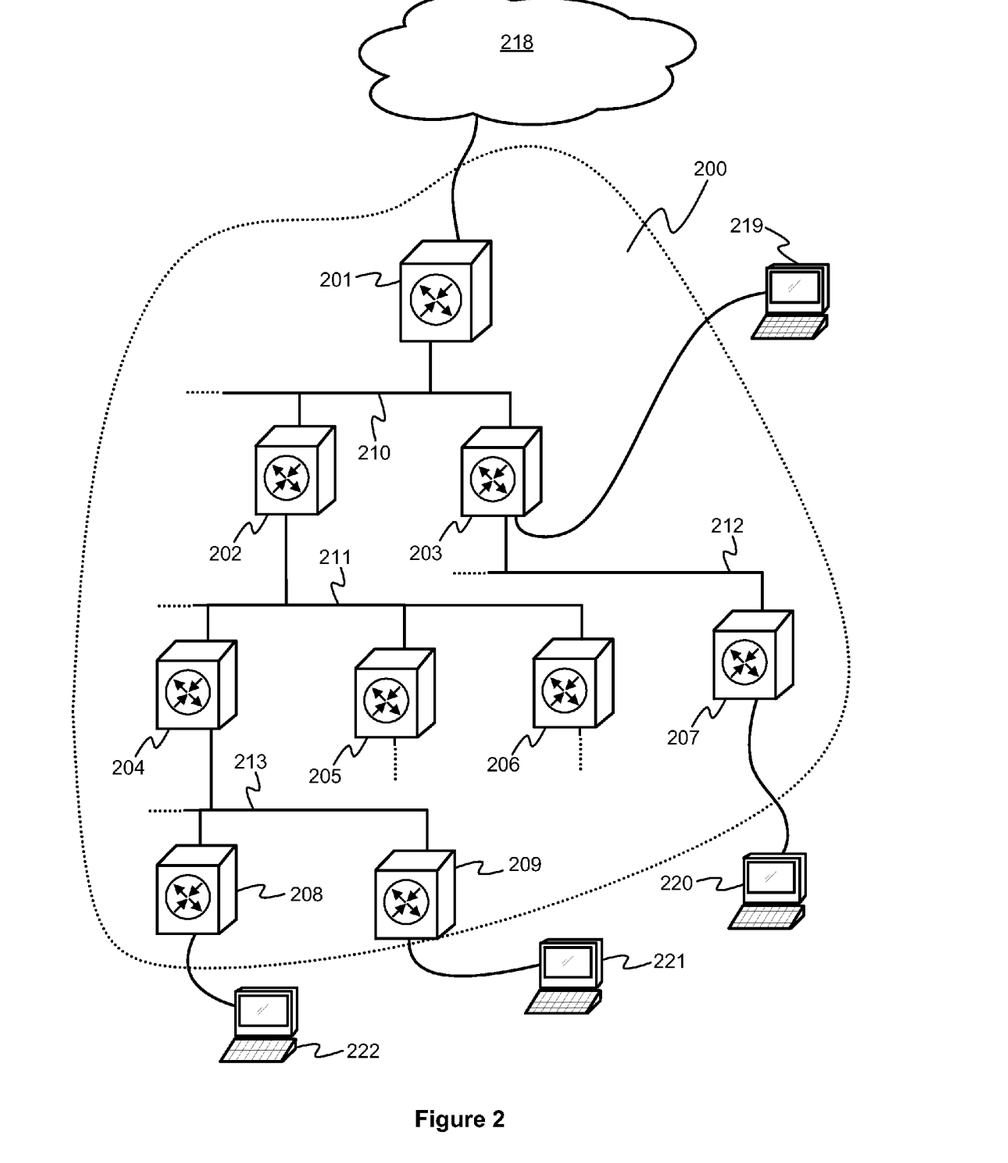
FIG. 2 shows a schematic illustration of a data transfer system according to an embodiment of the invention.

FIG. 2 shows a schematic illustration of a data transfer system 200 according to an embodiment of the invention. The data transfer system comprises network devices 201, 202, 203, 204, 205, 206, 207, 208, and 209 interconnected with data transfer links 210, 211, 212, and 213. The data transfer system is connected to a communication network 218 that can be, for example, the Internet. The network devices 201-209 can be, for example but not necessarily, routers arranged to support the Internet Protocol. Furthermore, the network devices may be arranged to support, for example, the Multi Protocol Label Switching ("MPLS"). Terminal devices 219, 220, 221, and 222 can be connected to the data transfer system 100 as illustrated in FIG. 2. In addition to the network devices 201-209, the data transfer system may comprise network devices which are not shown in FIG. 2 and/or the data transfer system may be connected to terminal devices which are not shown in FIG. 2. This is illustrated in FIG. 2 with data transfer links drawn to continue as a dashed-line. The network devices of the data transfer system have been organized to constitute a hierarchical logical arrangement that comprises several levels of network hierarchy. The data transfer system 200 shown in FIG. 2 differs from the data transfer system 100 shown in FIG. 1 in such a respect that the data transfer links 110-117 of the data transfer system 100 are point-to-point links, whereas the data transfer links 210-212 of the data transfer system 200 are data transfer busses which can be shared by more than two network elements and/or terminal devices. The data transfer busses can be implemented, for example, with the Ethernet technology. The principles of the network address configuration in the data transfer system 200 shown in FIG. 2 can be similar to the principles of the network address configuration in the data transfer system 100 shown in FIG. 1.

Figure 3:
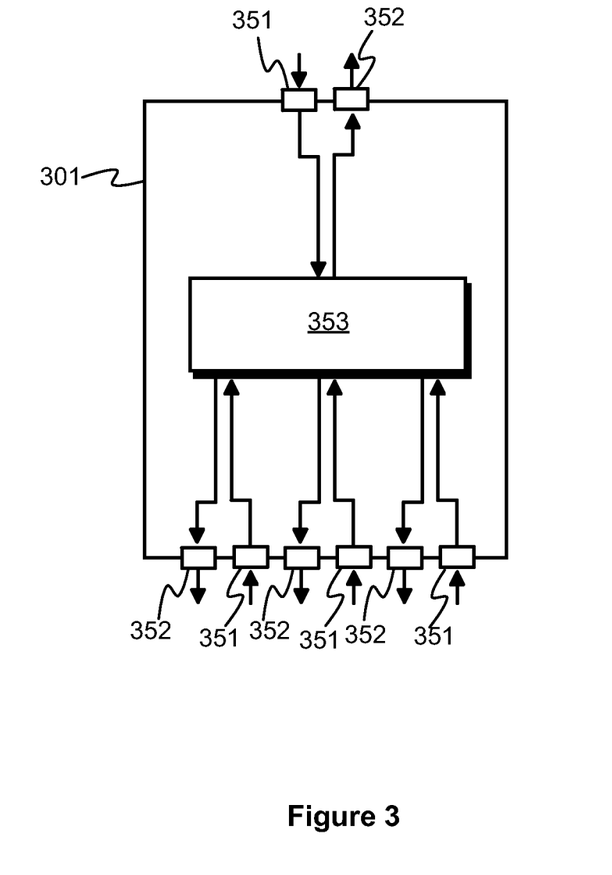
FIG. 3 shows a schematic illustration of a network device according to an embodiment of the invention.

FIG. 3 shows a schematic illustration of a network device 301 according to an embodiment of the invention. The network device comprises a reception interface 351 for receiving, via a communication network, from a first other network device a first data item defining a first set of network addresses related to a communication protocol being used in the communication network. The network device comprises a processing circuitry 353 for composing at least two second data items on the basis of the first data item so that each of the second data items is defining one of second sets of network addresses, and the second sets of network addresses are mutually non-overlapping sub-sets of the first set of network addresses. The network device comprises a transmission interface 352 for transmitting, via the communication network, the at least two second data items to at least two second other network devices, each of the second other network devices being a destination for one of the second data items in order to allocate one of the second sets of network addresses to each of the second other network devices. The transmission interface 352 comprises preferably at least two egress ports for at least two egress links: to the first other network device and to the at least two second other network devices. There can be separate egress ports towards each of the at least two second other network devices as in the system shown in FIG. 1, or there can be only one egress port for all the at least two second other network devices as in the system shown in FIG. 2. Correspondingly, the reception interface 351 comprises preferably at least two ingress ports for at least two ingress links: from the first other network device and from the at least two second other network devices. The processing circuitry 353 can comprise one or more of the following: a programmable processor, a dedicated hardware processor such as an application specific integrated circuit ("ASIC"), and/or a field configurable integrated circuit such as a field programmable gate array ("FPGA").

In a network device according to an embodiment of the invention, the processing circuitry 353 is arranged to control the transmission interface to transmit a first request message to the first other network device so as to request the first other network device to transmit the first data item.

In a network device according to an embodiment of the invention, the processing circuitry 353 is arranged to determine one of the second data items and to control the transmission interface to transmit this second data item to one of the second other network devices as a response to receiving a second request message from this second other network device.

In a network device according to an embodiment of the invention, the processing circuitry 353 is arranged to extract from the second request message one or more preferences and to compose the relevant second data item at least partly on the basis of the one or more preferences so as to fulfil needs of the second other network device related to the second request message.

In a network device according to an embodiment of the invention, the processing circuitry 353 is arranged to control the transmission interface to transmit the first request message to the first other network device as a response to a situation in which (i) the first data item has not been received and (ii) the second request message is received from one of the second other network devices, the second request message requesting to transmit one of the second data items to the one of the second other network devices.

In a network device according to an embodiment of the invention, the processing circuitry 353 is arranged to include control data to at least one of the second data items, the control data indicating whether or not the second other network device receiving this second data item is allowed to further divide the second set of network addresses defined by this second data item into smaller sub-sets.

In a network device according to an embodiment of the invention, the processing circuitry 353 is arranged to include control data to at least one of the second data items, the control data indicating an expiry time after which the second set of network addresses defined by this second data item are no longer valid and are free for re-allocation to another of the second other network devices unless revalidated prior to the expiry time.

In a network device according to an embodiment of the invention, the processing circuitry 353 is arranged to make the second set of network addresses allocated to one of the second other network devices free for re-allocation to another of the second other network devices as a response to a situation in which no revalidation message has been received from the one of the second other network devices by the expiry time.

In a network device according to an embodiment of the invention, the processing circuitry 353 is arranged to make the second set of network addresses allocated to one of the second other network devices free for re-allocation to another of the second other network devices as a response to a situation in which a data transfer connection to the one of the second other network devices is lost.

In a network device according to an embodiment of the invention, the processing circuitry 353 is arranged to make the second set of network addresses allocated to one of the second other network devices free for re-allocation to another of the second other network devices as a response to receiving a release message from the one of the second other network devices.

In a network device according to an embodiment of the invention, the processing circuitry 353 is arranged to control the transmission interface to transmit to the second other network devices an advertising message indicating a network address of the network device so as to enable the second other network devices to transmit requests for the second data items. The advertising message can comprise either a plurality of unicast messages each directed to a single destination or a multicast message directed to a plurality of destinations.

In a network device according to an embodiment of the invention, the processing circuitry 353 is arranged to extract from the first data item a network address-prefix defining a sub-set of the Internet address space, and the processing circuitry is arranged to form mutually non-overlapping elongations of the network address-prefix so as to compose the second data items.

In a network device according to an embodiment of the invention, the processing circuitry 353 is arranged to extract from the first data item two or more network address-prefixes defining mutually non-overlapping sub-sets of the Internet address space, and the processing circuitry is arranged to make each of the second data items to comprise at least one of the network address-prefixes and/or at least one elongation of at least one of the network address-prefixes.

A network device according to an embodiment of the invention is a router arranged to support the Internet Protocol. The network device is preferably further arranged to support the Multi Protocol Label Switching.

Figure 5:
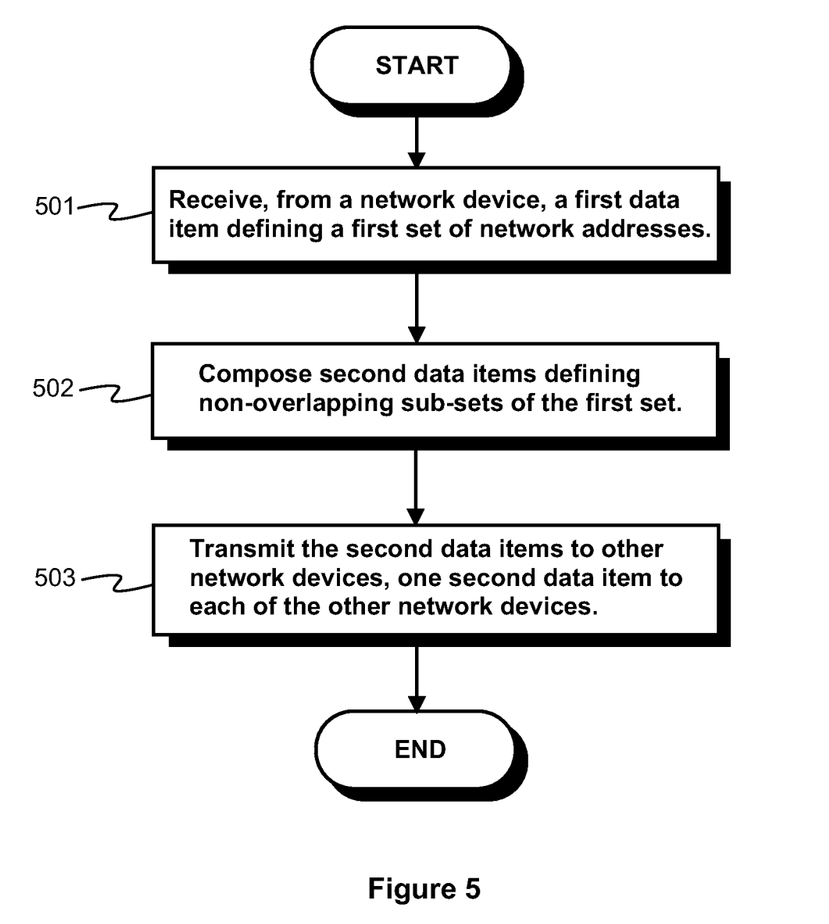
FIG. 5 shows a flow chart of a method according to an embodiment of the invention for network address configuration.

FIG. 5 shows a flow chart of a method according to an embodiment of the invention for network address configuration in a communication network. A phase 501 comprises receiving from a first network device a first data item defining a first set of network addresses related to a communication protocol being used in the communication network. The communication protocol can be, for example but not necessarily, the Internet protocol version 4 or 6, in which case the first data item may comprise a network address-prefix that defines a sub-set of the Internet address space. A phase 502 comprises composing second data items on the basis of the first data item so that each of the second data items defines one of second sets of network addresses, the second sets of network addresses being mutually non-overlapping sub-sets of the first set of network addresses. A phase 503 comprises transmitting the second data items to at least two second network devices of the communication network, each of the second network devices being a destination for one of the second data items in order to allocate one of the second sets of network addresses to each of the second network devices.

A method according to an embodiment of the invention comprises transmitting, prior to the phase 501, a request message to the first network device so as to request the first network device to transmit the first data item.

A method according to an embodiment of the invention comprises determining one of the second data items and transmitting this second data item to one of the second network devices as a response to receiving a request message from this second network device, i.e. the phases 502 and 501 are carried out for this second network device upon the request received from this second network device.

A method according to an embodiment of the invention comprises extracting from the request message received from the second network device one or more preferences and composing the relevant second data item at least partly on the basis of the one or more preferences so as to fulfil needs of the second network device.

A method according to an embodiment of the invention comprises transmitting, prior to the phase 501, a request concerning the first data item to the first network device as a response to a situation in which (i) the first data item has not been received and (ii) a request concerning the second data item has been received from one of the second network devices.

A method according to an embodiment of the invention comprises including control data to at least one of the second data items, the control data indicating whether or not the second network device receiving this second data item is allowed to further divide the second set of network addresses defined by this second data item into smaller sub-sets.

A method according to an embodiment of the invention comprises including control data to at least one of the second data items, the control data indicating an expiry time after which the second set of network addresses defined by this second data item are no longer valid and are free for re-allocation unless revalidated prior to the expiry time.

A method according to an embodiment of the invention comprises making the second set of network addresses allocated to one of the second network devices free for re-allocation to another of the second network devices as a response to a situation in which no revalidation message has been received from the one of the second network devices by the expiry time.

A method according to an embodiment of the invention comprises making the second set of network addresses allocated to one of the second network devices free for re-allocation to another of the second network devices as a response to a situation in which a data transfer connection to the one of the second network devices is lost.

A method according to an embodiment of the invention comprises making the second set of network addresses allocated to one of the second network devices free for re-allocation to another of the second network devices as a response to receiving a release message from the one of the second network devices.

A method according to an embodiment of the invention comprises transmitting to the second network devices an advertising message indicating a network address so as to enable the second network devices to transmit requests for the second data items.

A method according to an embodiment of the invention comprises extracting from the first data item a network address-prefix defining a sub-set of the Internet address space, and forming mutually non-overlapping elongations of the network address-prefix so as to compose the second data items.

A method according to an embodiment of the invention comprises extracting from the first data item two or more network address-prefixes defining mutually non-overlapping sub-sets of the Internet address space, and making each of the second data items to comprise at least one of the network address-prefixes and/or at least one elongation of at least one of the network address-prefixes.

A computer program according to an embodiment of the invention for network address configuration comprises computer executable instructions for controlling a programmable processor of a network device to:
- extract from data received, via a communication network, from a first other network device a first data item defining a first set of network addresses related to a communication protocol being used by the network device,
- compose at least two second data items on the basis of the first data item so that each of the second data items is defining one of second sets of network addresses, the second sets of network addresses being mutually non-overlapping sub-sets of the first set of network addresses, and
- controlling the network device to transmit, via the communication network, the at least two second data items to at least two second other network devices, each of the second other network devices being a destination for one of the second data items in order to allocate one of the second sets of network addresses to each of the second other network devices.

A computer program product according to an embodiment of the invention comprises a computer readable medium, e.g. a compact disc ("CD"), encoded with a computer program according to an embodiment of invention.

A signal according to an embodiment of the invention is encoded to carry information defining a computer program according to an embodiment of invention.

The specific examples provided in the description given above should not be construed as limiting. Therefore, the invention is not limited merely to the embodiments described above, many variants being possible.

What is claimed is:

1. A network device comprising:
a reception interface for receiving, via a communication network, from a first other network device a first data item defining a first set of network addresses related to a communication protocol being used in the communication network, and
a transmission interface for transmitting, via the communication network, at least two second data items to at least two second other network devices, each of the second other network devices being a destination for one of the second data items, wherein the network device further comprises a processing circuitry for composing the at least two second data items on the basis of the first data item so that each of the second data items is defining one of second sets of network addresses so as to allocate one of the second sets of network addresses to each of the second other network devices, the second sets of network addresses being mutually non-overlapping sub-sets of the first set of network addresses.

2. A network device according to claim 1, wherein the processing circuitry is arranged to control the transmission interface to transmit a first request message to the first other network device so as to request the first other network device to transmit the first data item.

3. A network device according to claim 1, wherein the processing circuitry is arranged to determine one of the second data items and to control the transmission interface to transmit this second data item to one of the second other network devices as a response to receiving a second request message from this second other network device.

4. A network device according to claim 3, wherein the processing circuitry is arranged to extract from the second request message one or more preferences and to compose the relevant second data item at least partly on the basis of the one or more preferences so as to fulfil needs of the second other network device related to the second request message.

5. A network device according to claim 2, wherein the processing circuitry is arranged to control the transmission interface to transmit the first request message as a response to a situation in which (i) the first data item has not been received and (ii) a second request message is received from one of the second other network devices, the second request message requesting to transmit one of the second data items to the one of the second other network devices.

6. A network device according to claim 1, wherein the processing circuitry is arranged to include control data to at least one of the second data items, the control data indicating whether or not the second other network device receiving this second data item is allowed to further divide the second set of network addresses defined by this second data item into smaller sub-sets.

7. A network device according to claim 1, wherein the processing circuitry is arranged to include control data to at least one of the second data items, the control data indicating an expiry time after which the second set of network addresses defined by this second data item are no longer valid and are free for re-allocation unless revalidated prior to the expiry time.

8. A network device according to claim 7, wherein the processing circuitry is arranged to make the second set of network addresses allocated to one of the second other network devices free for re-allocation as a response to a situation in which no revalidation message has been received from the one of the second other network devices by the expiry time.

9. A network device according to claim 1, wherein the processing circuitry is arranged to make the second set of network addresses allocated to one of the second other network devices free for re-allocation as a response to a situation in which a data transfer connection to the one of the second other network devices is lost.

10. A network device according to claim 1, wherein the processing circuitry is arranged to make the second set of network addresses allocated to one of the second other network devices free for re-allocation as a response to receiving a release message from the one of the second other network devices.

11. A network device according to claim 1, wherein the processing circuitry is arranged to control the transmission interface to transmit to the second other network devices an advertising message indicating a network address of the network device so as to enable the second other network devices to transmit requests for the second data items.

12. A network device according to claim 1, wherein the processing circuitry is arranged to extract from the first data item a network address-prefix defining a sub-set of the Internet address space, and the processing circuitry is arranged to form mutually non-overlapping elongations of the network address-prefix so as to compose the second data items.

13. A network device according to claim 1, wherein the processing circuitry is arranged to extract from the first data item two or more network address-prefixes defining mutually non-overlapping sub-sets of the Internet address space, and the processing circuitry is arranged to make each of the second data items to comprise at least one of the network address-prefixes and/or at least one elongation of at least one of the network address-prefixes.

14. A network device according to claim 12, wherein the network device is a router arranged to support the Internet Protocol.

15. A network device according to claim 14, wherein the network device is further arranged to support the Multi Protocol Label Switching.

16. A data transfer system comprising network devices interconnected with data transfer links and organized to constitute a hierarchical logical arrangement having at least three levels of network hierarchy, the network devices including a first network device, a second network device at a lower level of the network hierarchy than the first network device, and at least two third network devices at a lower level of the network hierarchy than the second network device, wherein:
the first network device is arranged to transmit to the second network device a first data item defining a first set of network addresses related to a communication protocol being used by the network devices, and
the second network device is arranged to transmit second data items to the at least two third network devices, each of the third network devices being a destination for one of the second data items,
wherein the second network device comprises a processing circuitry for composing the second data items on the basis of the first data item so that each of the second data items is defining one of second sets of network addresses so as to allocate one of the second sets of network addresses to each of the third network devices, the second sets of network addresses being mutually non-overlapping sub-sets of the first set of network addresses.

17. A data transfer system according to claim 16, wherein the first network device is arranged to transmit the first data item as a response to a request message received from the second network device.

18. A data transfer system according to claim 16, wherein the second network device is arranged to determine one of the second data items and transmit this second data item to one of the third network devices as a response to a request message received from this third network device.

19. A data transfer system according to claim 18, wherein the second network device is arranged to extract from the request message received from the third network device one or more preferences and to compose the relevant second data item at least partly on the basis of the one or more preferences so as to fulfil needs of the third network device.

20. A data transfer system according to claim 17, wherein the second network device is arranged to transmit the request message to the first network device as a response to a situation in which (i) the first data item has not been received at the first network device and (ii) a second request message has been received from one of the third network devices, the second request message requesting to transmit one of the second data items to the one of the third network devices.

21. A data transfer system according to claim 16, wherein the second network device is arranged to include control data to at least one of the second data items, the control data indicating whether or not the third network device receiving this second data item is allowed to further divide the second set of network addresses defined by this second data item into smaller sub-sets and to allocate the smaller sub-sets for fourth network devices at a lower level of the network hierarchy than the third network devices.

22. A data transfer system according to claim 16, wherein the second network device is arranged to include control data to at least one of the second data items, the control data indicating an expiry time after which the second set of network addresses defined by this second data item are no longer valid and are free for re-allocation unless revalidated prior to the expiry time.

23. A data transfer system according to claim 22, wherein the second network device is arranged to make the second set of network addresses allocated to one of the third network devices free for re-allocation as a response to a situation in which no revalidation message has been received from the one of the third network devices by the expiry time.

24. A data transfer system according to claim 16, wherein the second network device is arranged to make the second set of network addresses allocated to one of the third network devices free for re-allocation as a response to a situation in which a data transfer connection to the one of the third network devices is lost.

25. A data transfer system according to claim 16, wherein the second network device is arranged to make the second set of network addresses allocated to one of the third network devices free for re-allocation as a response to receiving a release message from the one of the third network devices.

26. A data transfer system according to claim 16, wherein the second network device is arranged to transmit to the third network devices an advertising message indicating a network address of the second network device so as to enable the third network devices to transmit requests for the second data items.

27. A data transfer system according to claim 16, wherein the second network device is arranged to extract from the first data item a network address-prefix defining a sub-set of the Internet address space, and the second network device is arranged to form mutually non-overlapping elongations of the network address-prefix so as to compose the second data items.

28. A data transfer system according to claim 16, wherein the second network device is arranged to extract from the first data item two or more network address-prefixes defining mutually non-overlapping sub-sets of the Internet address space, and the second network device is arranged to make each of the second data items to comprise at least one of the network address-prefixes and/or at least one elongation of at least one of the network address-prefixes.

29. A data transfer system according to claim 27, wherein the network devices are routers arranged to support the Internet Protocol.

30. A data transfer system according to claim 29, wherein the network devices are further arranged to support the Multi Protocol Label Switching.

31. A method for network address configuration, the method comprising:
- receiving from a network device of a communication network a first data item defining a first set of network addresses related to a communication protocol being used in the communication network,
- composing at least two second data items on the basis of the first data item so that each of the second data items defines one of second sets of network addresses so as to allocate one of the second sets of network addresses to each of at least two other network devices, the second sets of network addresses being mutually non-overlapping sub-sets of the first set of network addresses, and
- transmitting the second data items to the at least two other network devices of the communication network, each of the other network devices being a destination for one of the second data items.

32. A non-transitory computer readable medium encoded with a computer program for network address configuration, the computer program comprising computer executable instructions for controlling a programmable processor of a network device to:
- extract from data received, via a communication network, from a first other network device a first data item defining a first set of network addresses related to a communication protocol being used by the network device,
- control the network device to transmit, via the communication network, at least two second data items to at least two second other network devices, each of the second other network devices being a destination for one of the second data items, and
- compose the at least two second data items on the basis of the first data item so that each of the second data items is defining one of second sets of network addresses so as to allocate one of the second sets of network addresses to each of the second other network devices, the second sets of network addresses being mutually non-overlapping sub-sets of the first set of network addresses.

* * * * *